United States Patent
Chretien et al.

(10) Patent No.: US 9,528,012 B2
(45) Date of Patent: *Dec. 27, 2016

(54) ELECTRON BEAM CURABLE INKS FOR INDIRECT PRINTING

(71) Applicant: XEROX CORPORATION, Norwalk, CT (US)

(72) Inventors: Michelle N. Chretien, Mississauga (CA); Jennifer L. Belelie, Oakville (CA); Naveen Chopra, Oakville (CA); Barkev Keoshkerian, Thornhill (CA); Marcel P. Breton, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/067,074

(22) Filed: Oct. 30, 2013

(65) Prior Publication Data

US 2015/0116432 A1 Apr. 30, 2015

(51) Int. Cl.

| B41J 2/21 | (2006.01) |
|---|---|
| C09D 11/101 | (2014.01) |
| C09D 7/12 | (2006.01) |
| B41J 11/00 | (2006.01) |
| B41J 2/005 | (2006.01) |
| B41M 5/025 | (2006.01) |

(Continued)

(52) U.S. Cl.
CPC ............ *C09D 11/101* (2013.01); *B41J 2/0057* (2013.01); *B41J 2/2107* (2013.01); *B41J 11/0015* (2013.01); *B41M 5/0256* (2013.01); *B41M 7/0081* (2013.01); *C09D 7/125* (2013.01); *C09D 11/38* (2013.01)

(58) Field of Classification Search
CPC ............... B41J 2/01; B41J 2/0057; B41J 2/05; B41J 2/1433; B41J 2/15; B41J 2/155; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 3/60; C09D 11/005; C09D 11/30; C09D 11/32; C09D 11/322; C09D 11/324; C09D 11/328; C09D 11/36; C09D 11/38; C09D 11/40; C09D 11/52; C09D 11/54; C09D 11/101
USPC ... 347/9–22, 56, 86, 88, 95–105; 106/31.13, 106/31.27, 31.6, 31.65, 31.85, 31.77, 31.7
See application file for complete search history.

(56) References Cited

U.S. PATENT DOCUMENTS

| 6,472,523 B1 | 10/2002 | Banning |
|---|---|---|
| 6,476,219 B1 | 11/2002 | Duff |

(Continued)

OTHER PUBLICATIONS

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.

(Continued)

*Primary Examiner* — Manish S Shah
(74) *Attorney, Agent, or Firm* — Pillsbury Winthrop Shaw Pittman LLP

(57) ABSTRACT

The present disclosure provides an electron beam ink comprising a radiation curable material selected from the group consisting of a curable monomer, a curable oligomer, and mixtures thereof; and a surfactant, which is suitable for use in an indirect printing method. The present disclosure also provides a method of printing using an electron beam curable ink.

17 Claims, 1 Drawing Sheet

(51) Int. Cl.
*C09D 11/38* (2014.01)
*B41M 7/00* (2006.01)

(56) References Cited

U.S. PATENT DOCUMENTS

| | | |
|---|---|---|
| 6,576,747 B1 | 6/2003 | Carlini |
| 6,576,748 B1 | 6/2003 | Carlini |
| 6,590,082 B1 | 7/2003 | Banning |
| 6,646,111 B1 | 11/2003 | Carlini |
| 6,663,703 B1 | 12/2003 | Wu |
| 6,673,139 B1 | 1/2004 | Wu |
| 6,696,552 B2 | 2/2004 | Mayo |
| 6,713,614 B2 | 3/2004 | Carlini |
| 6,726,755 B2 | 4/2004 | Titterington |
| 6,755,902 B2 | 6/2004 | Banning |
| 6,821,327 B2 | 11/2004 | Jaeger |
| 6,958,406 B2 | 10/2005 | Banning |
| 7,053,227 B2 | 5/2006 | Jaeger |
| 7,208,257 B2 | 4/2007 | Cheng |
| 7,270,408 B2 * | 9/2007 | Odell .................. B41J 2/0057 347/102 |
| 7,293,868 B2 * | 11/2007 | Odell .................. C09D 11/34 347/100 |
| 7,381,831 B1 | 6/2008 | Banning |
| 7,427,323 B1 | 9/2008 | Birau |
| 7,934,823 B2 * | 5/2011 | Belelie .................. C09D 11/34 347/100 |
| 2006/0158469 A1 * | 7/2006 | Koike .................. B41J 2/17503 347/7 |
| 2006/0159850 A1 * | 7/2006 | Breton .................. C09D 11/101 427/258 |
| 2008/0074482 A1 * | 3/2008 | Makuta .................. B41J 11/002 347/102 |
| 2009/0099277 A1 * | 4/2009 | Nagvekar ............ C08G 18/672 522/153 |
| 2009/0234041 A1 * | 9/2009 | Belelie .................. C09D 11/34 522/182 |

OTHER PUBLICATIONS

U.S. Appl. No. 14/067,054, filed Oct. 30, 2013, entitled Photocurable Inks for Indirect Printing; First Inventor: Michelle N. Chretien.
U.S. Appl. No. 14/067,152, filed Oct. 30, 2013, entitled "Curable Aqueous Latex Inks for Indirect Printing"; First Inventor: Jennifer L. Belelie.
U.S. Appl. No. 14/067,191, filed Oct. 30, 2013, entitled "Curable Latex Inks Comprising an Unsaturated Polyester for Indirect Printing"; First Inventor: Jennifer L. Belelie.
U.S. Appl. No. 14/067,240, filed Oct. 30, 2013, entitled "Emulsified Aqueous Ink Comprising Reactive Alkoxysilane for Indirect Printing"; First Inventor: Naveen Chopra.
U.S. Appl. No. 14/067,290, filed Oct. 30, 2013, entitled "Dual Component Inks Comprising Reactive Latexes for Indirect Printing"; First Inventor: Naveen Chopra.
U.S. Appl. No. 14/067,325, filed Oct. 30, 2013, entitled "Emulsified Curable Inks for Indirect Printing"; First Inventor: Daryl W. Vanbesien.
U.S. Appl. No. 14/067,443, filed Oct. 30, 2013, entitled "Emulsified Electrorheological Inks for Indirect Printing"; First Inventor: Naveen Chopra.
U.S. Appl. No. 14/066,716, filed Oct. 30, 2013, entitled "Ink Jet Ink for Indirect Printing Applications"; First Inventor: Jenny Eliyahu.

* cited by examiner

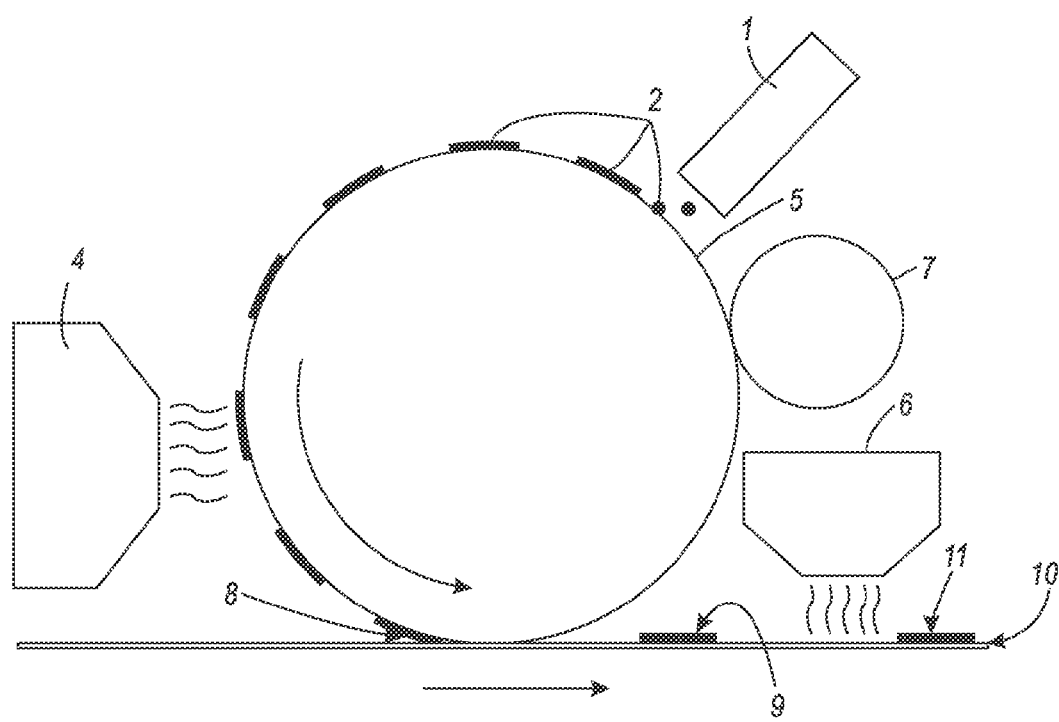

ELECTRON BEAM CURABLE INKS FOR INDIRECT PRINTING

INTRODUCTION

The presently disclosed embodiments are related generally to an electron beam curable ink composition for indirect printing method.

Indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation etc.) and the resulting transient image is then transferred to the substrate.

Inks suitable for such indirect printing process may be designed and optimized to be compatible with the different subsystems, such as jetting, transfer, etc., that enable high quality printing at high speed. Typically, inks that display good wettability do not efficiently transfer onto the final substrate, or conversely inks that transfer efficiently to the substrate do not wet the intermediate receiving member. To date, there is no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided an electron beam curable ink for use in an indirect printing process comprising: a radiation curable material selected from the group consisting of a curable monomer, a curable oligomer, and mixtures thereof; and a surfactant, wherein the ink is partially cured to a viscosity of from about 5,000 to about 1,000,000 cps before transfer from the intermediate transfer member to the final substrate.

In particular, the present embodiments provide an electron beam curable ink for use in an indirect printing process comprising: a curable monomer; a curable oligomer; and a silicone surfactant comprising one or more functional group selected from the group consisting of carbinol, alkyl, aryl, glycol, polyether, siloxane, and mixtures thereof; wherein the ink is partially cured to a viscosity of about 5,000 to about 1,000,000 cps before transfer from the intermediate transfer member to the final substrate.

In other embodiments, there is provided a method of printing with an electron beam curable ink comprising: providing an electron beam curable ink comprising a radiation curable material selected from the group consisting of a curable monomer, a curable oligomer, and mixtures thereof; and a surfactant; applying the ink to an intermediate substrate; exposing the ink to a first electron beam irradiation to partially polymerize the radiation curable material; transferring the ink from the intermediate substrate to a final substrate; and exposing the ink to a second electron beam irradiation to induce complete crosslinking to form an image.

BRIEF DESCRIPTION OF THE DRAWINGS

For a better understanding of the present embodiments, reference may be made to the accompanying figures.

FIG. 1 is a diagrammatical illustration of an imaging member in accordance with the present embodiments for applying a two-step transfer and curing process in an indirect printing system.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "curable" describes, for example, a material that may be cured via polymerization, including for example free radical routes. The term "radiation-curable" refers, for example, to all forms of curing upon exposure to a radiation source, including light and heat sources and including in the presence or absence of initiators. Exemplary radiation-curing techniques include, but are not limited to, curing using electron-beam (i.e., electron beam) radiation, optionally in the absence of photoinitiators, curing using ultraviolet (UV) light, for example having a wavelength of 200-400 nm or more rarely visible light, optionally in the presence of photoinitiators and/or sensitizers, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES rheometer, both made by Rheometrics, a division of TA Instruments. The present embodiments disclose electron beam curable inks and their uses for an indirect print process, or indirect printing ink jet applications. The present embodiments also disclose methods of printing with an electron beam curable ink, where the electron beam curable inks cure upon exposure to electron beam radiation.

The electron beam curable ink of the present embodiments may possess the required surface tension (in the range of 15-50 mN/m), viscosity (in the range of 3-20 cps), and pigment particle size (<600 nm) for use in an inkjet (e.g., piezoelectric) printhead.

In embodiments, the electron beam curable ink has a surface tension of from about 15 mN/m to about 50 mN/m, for example from about 20 mN/m to about 40 mN/m, or from about 20 mN/m to about 30 mN/m at the jetting temperature.

In embodiments, the electron beam curable ink has a viscosity of from about 2 cps to about 20 cps, for example from about 3 cps to about 15 cps, or from about 4 cps to about 12 cps, at the temperature of jetting. In particular embodiments, the electron beam curable ink compositions are jetted at temperatures of less than about 100° C., such as from about 25° C. to about 100° C., or from about 30° C. to about 95° C., such as from about 30° C. to about 90° C.

In embodiments, the electron beam curable ink has an average pigment particle size of less than about 600 nm, for example from about 25 nm to about 500 nm, or from about 50 nm to about 300 nm.

FIG. 1 discloses a diagrammatical illustration of an imaging system in accordance with the present embodiments for applying a two-step transfer and curing process whereby an ink of the present disclosure is printed onto an intermediate transfer surface for subsequent transfer to a receiving substrate. During the indirect print process, the ink of the present embodiments is jetted and spread onto an intermediate receiving member 5 via an inkjet 1, forming a transient image 2. The intermediate receiving member 5 may be provided in the form of a drum, as shown in FIG. 1, but may also be provided as a web, platen, belt, band or any other suitable design.

Referring again to FIG. 1, ink 2 is partially cured (precured) by an electron beam radiation 4 at a low dose (e.g., 0.1-1.0 Mrad) to induce a "tacky" state in which the ink has a viscosity of from about 5,000 to about 1,000,000 cps, from about 50,000 to about 200,000 cps, or from about 50,000 to about 150,000 cps. The resulting ink film includes partially cured monomers and/or oligomers, additives, and optional colorants. The "tacky" film (i.e., ink image 8) may be then transferred under controlled temperature and pressure from the intermediate receiving member 5 to the final receiving substrate 10. The transfer of the ink image may be performed through contact under pressure and/or at an elevated temperature. The transferred image 9 is then further subjected to electron beam radiation 6 at a high dose (e.g., 1-4 Mrad) to induce complete crosslinking thereby resulting in a robust image 11. The resulting image is both robust and free of photoinitiator photoproducts making the electron beam of the present disclosure and print process suitable for food packaging applications, even for food packaging applications that require food contact. Image robustness is especially important for packaging applications such as folding carton, for example.

It is important to note that an ink suitable for an indirect printing process must be able to wet the intermediate receiving member 5 to enable formation of the transient image 2, and undergo a stimulus induced property change to enable release from the intermediate receiving member 5 in the transfer step.

Radiation Curable Monomers and Oligomers

In embodiments, the electron beam curable ink includes a radiation curable material. Examples of radiation curable materials include any suitable curable monomer, and/or oligomer. In embodiments, the curable monomer is a monofunctional acrylate monomer, a multifunctional acrylate monomer, a monofunctional methacrylate monomer, a multifunctional methacrylate monomer, or mixtures thereof. In embodiments, the curable monomer is a methacrylate monomer, acrylate monomer, dimethacrylate monomer, diacrylate monomer, triacrylate monomer, and mixtures thereof. Specific examples of curable monomers include, for example, 3,3,5,trimethylcyclohexyl methacrylate (e.g., CD421®), dicyclopentadienyl methacrylate (e.g., CD535®), diethylene glycol methyl ether methacrylate (e.g., CD545®), methoxy polyethylene glycol (550) monoacrylate monomer (CD553®), alkoxylated tetrahydrofurfuryl acrylate (e.g., CD611®), ethoxylated (4) nonyl phenol methacrylate (e.g., CD612®), ethoxylated nonyl phenol acrylate (e.g., CD613®), triethylene glycol ethyl ether methacrylate (e.g., CD730®), monofunctional acid ester (e.g., CD9050®), alkoxylated lauryl acrylate (e.g., CD9075®), alkoxylated phenol acrylate (e.g., CD9087®), tetrahydrofurfuryl methacrylate (e.g., SR203), isodecyl methacrylate (e.g., SR242), 2(2-ethoxyethoxy) ethyl acrylate (e.g., SR256), stearyl acrylate (e.g., SR257), tetrahydrofurfuryl acrylate (e.g., SR285®), lauryl methacrylate (e.g., SR313A®), stearyl methacrylate (e.g., SR324®), lauryl acrylate (e.g., SR335®), phenoxylethyl acrylate (e.g., SR339®), 2-phenoxylethyl methacrylate (e.g., SR340®), isodecyl acrylate (e.g., SR395®), isobornyl methacrylate (e.g., SR423A®), isooctyl acrylate (e.g., SR440®), octadecyl acrylate (SR484®), tridecyl acrylate (SR489®), tridecyl methacrylate (SR493®), caprolactone acrylate (e.g., SR495®), ethoxylated (4) nonyl phenol acrylate (e.g., SR504®), isobornyl acrylate (e.g., SR506A®), cyclic trimethylolpropane formal acrylate (e.g., SR531®), methoxy polyethylene glycol (350) monomethacrylate (e.g., SR550®), polyethylene glycol (400) dimethacrylate (SR603®), polyethylene glycol (600) diacrylate (e.g., SR610®), polypropylene glycol (400) dimethacrylate (e.g., SR644®), polyethylene glycol (1000) dimethacrylate (e.g., SR740A®), tricyclodecane dimethanol diacrylate (e.g., SR833S®), propoxylated (2) neopentyl glycol diacrylate (e.g., SR9003®), alkoxylated neopentyl glycol diacrylate (e.g., SR9045®), alkoxylated aliphatic diacrylate (e.g., SR9209A®), dipropylene glycol diacrylate (e.g., SR508®), and the like, as well as mixtures thereof. All of the monomers disclosed above are commercially available from Sartomer Co. Inc.

The viscosity of the curable acrylate monomers is typically from about 1-150 cps, from about 2-145 cps, or from about 3-140 cps at 25° C.

Specific examples of curable oligomers include, for example, diacrylate oligomer (e.g., CN132®), aliphatic monoacrylate oligomer (e.g., CN152®), aromatic monoacrylate oligomer (e.g., CN131®), acrylic oligomer (e.g., CN2285®), tetrafunctional acrylic oligomer (e.g., CN549®), and the like, as well as mixtures thereof. All of the oligomers disclosed above are commercially available from Sartomer Co. Inc.

The viscosity of the curable acrylate oligomers is typically from about 50 to about 1200 cps, or from about 75 to 1100 cps, or from about 100-1000 cps at 25° C.

The monomer, oligomer, or mixtures thereof, can be present in any suitable amount. In embodiments, the monomer, oligomer, or mixtures thereof is present in an amount of from about 50 to about 95%, or from about 60 to about 90%, or from about 70 to about 85%, by weight based on the total weight of the ink.

Surfactants

A surfactant is generally used to lower the surface tension of the composition to allow wetting and leveling of the substrate surface, if necessary, before curing. The surfactant can be selected by both its hydrophobic and hydrophilic properties. In embodiments, the ink of the present disclosure includes a silicone containing surfactant. These silicone surfactants may include one or more functional group such as carbinol, alkyl, aryl, glycol, polyether, siloxane, and mixtures thereof. Suitable surfactants may include, but are not limited to polydimethylsiloxane copolymer (Siltech® C-20, C-42, C-468), alkyl and aryl modified polydimethylsiloxane (Siltech® C-32), silicone polyether (Siltech®

C-101, 442), block copolymer of dimethylsiloxane and a polyoxyalkylene (Siltech® C-241), and the like, and mixtures thereof.

The surfactants may be included in the ink of the present disclosure in an amount from about 0.1% to about 5%, from about 0.1% to about 3%, from 0.1% to about 2%, or from about 0.1% to about 1.0%, by weight based on the total weight of the ink.

The surfactants may be miscible with the radiation curable material (i.e., acrylate or methacrylate miscible).

Colorants

The ink compositions may optionally contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from BASF); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The ink may also contain a pigment stabilizing surfactant or dispersant having portions or groups that have an excellent adsorption affinity for the various pigments used in the colored inks of the ink set, and also having portions or groups that allow for dispersion within the ink vehicle are desired. Selection of an appropriate dispersant for all of the colored inks of the ink set may require trial and error evaluation, capable by those of ordinary skill in the art, due to the unpredictable nature of dispersant/pigment combinations.

As example dispersants, random and block copolymers may be suitable. A particularly desirable block copolymer is an amino acrylate block copolymer, for example including an amino or amino acrylate block A and an acrylate block B, the acrylate portions permitting the dispersant to be stably and well dispersed in the ink vehicle while the amino portions adsorb well to pigment surfaces. Commercially available examples of block copolymer dispersants that have been found suitable for use herein are DISPERBYK-2001 (BYK Chemie GmbH) and EFKA 4340 (Ciba Specialty Chemicals).

The colorant may be included in the ink composition in an amount of from, for example, from about 0.1 to about 15% by weight of the ink composition, such as from about 2 to about 9% by weight of the ink composition.

Ink Composition Preparation and Use

The inks of embodiments may be prepared by any suitable technique. As an example, the inks may be prepared by combining the monomers, oligomers, stabilizer and surfactant and stirring at a temperature between 30 and 90° C. until a homogeneous solution is formed. To this solution is added the pigment dispersion which can be incorporated by any suitable method, including stirring and homogenization. The ink composition may then be filtered, optionally at an elevated temperature, to remove extraneous particles. Further examples of ink preparation methods are set forth in the Examples below.

The electron beam curable ink compositions described herein may be jetted at temperatures of less than about 100° C., such as from about 25° C. to about 100° C., or from about 30° C. to about 95° C. The ink compositions are thus ideally suited for use in piezoelectric ink jet devices.

The ink compositions can be employed in indirect (offset) printing ink-jet applications, wherein when droplets of the ink are ejected in an imagewise pattern onto a recording substrate, the recording substrate is an intermediate-transfer member and the ink in the imagewise pattern is subsequently transferred from the intermediate-transfer member to a final recording substrate.

Once upon the intermediate-transfer member surface, the jetted ink composition is exposed to radiation to a limited extent so as to effect a limited curing of the ink upon the intermediate-transfer member surface. This intermediate curing is not to cure the ink composition to its full extent, but merely to assist in imparting the desired viscosity and/or tack to the ink image before transfer. Through this intermediate curing step, the ink can be transferred to the receiving substrate, leaving little residue on the transfer member. For controlling the extent of the curing if an intermediate cure is practiced, reference is made to Co-pending application Ser. Nos. 11/034,850 and 11/005,991, each incorporated herein by reference. Following jetting to the intermediate-transfer member and intermediate curing thereon, the ink composition is thereafter transferred to an image receiving substrate. The substrate may be any suitable material such as paper, flexible food packaging substrates, adhesives for food packaging paper, foil-laminating fabric, plastic, glass, metal, etc. Following transfer to the substrate, the ink composition is then cured by exposing the image on the substrate to electron beam irradiation. For example, irradiation having the appropriate dose may be used. This initiates the curing reaction of the ink composition. The curable components of the ink composition react to form a cured or cross-linked network of appropriate viscosity. In embodiments, after the final curing step (see 6, FIG. 1), the curing is substantially complete, i.e., at least 75% of the curable components are cured (reacted and/or cross-linked). This allows the ink composition to be substantially hardened, and thereby to be much more scratch resistant, and also adequately controls the amount of show-through on the substrate, if applicable.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured by exposure to e-beam irradiation.

When the ink is electron beam cured, the samples are exposed to electron beams using a conventional electron beam generator such as those available from Electron Crosslinking AB (Sweden) or Energy Sciences, Inc. (ESI). The method includes providing an electron beam curable ink of the present embodiments; applying the ink to an intermediate substrate; exposing the ink to a first electron beam irradiation to partially polymerize the radiation curable material; transferring the ink from the intermediate substrate to a final substrate; and exposing the ink to a second electron beam irradiation to induce complete crosslinking to form an image. The first electron beam irradiation is used for pre-curing of the radiation curable materials. During the pre-curing step, the monomers/oligomers may be partially polymerized to form an ink film on the intermediate transfer substrate. Pre-curing of the transient image may increase the cohesion of the ink film and allows for more efficient ink transfer from the intermediate substrate to final substrate. Typically, the first electron beam irradiation delivers a lower dose than that of the second electron beam irradiation. In embodiments, the first electron beam irradiation delivers a dose of from about 0.1 Mrad to about 1.3 Mrad, from 0.1 Mrad to 1.2 Mrad, from 0.1 Mrad to 1.1 Mrad, or from 0.1 to 1.0 Mrad. The second electron beam irradiation may be used to induce complete crosslinking of the radiation curable materials, thereby forming an image. In embodiments, the first electron beam irradiation delivers a dose of above 1 Mrad, for example from about 1 Mrad to about 10 Mrad, from 1.0 to Mrad to 8 Mrad, or from 1.0 from Mrad to 5 Mrad.

It is also noted that no drying step is required in the printing process, as the ink of the present disclosure is non-aqueous.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Prophetic Example

Ink Formulation A

To a 50 mL amber glass vial is added SR9003, SR399LV, CN132, Irgastab UV10, and Siltech C-101 surfactant and the mixture is stirred at 30-90° C. for 30 minutes to ensure dissolution of the UV stabilizer. The pigment dispersion is then added and the ink is homogenized for 10-20 minutes at 2,000-3,000 RPM. The pigment dispersion can be a cyan, a magenta, a yellow, or a black concentrate prepared by any suitable process, for example, by a ball milling in dispersant and reactive diluents.

Table 1 below shows the components of Ink Formulation A.

TABLE 1

| Component | Function | wt % |
|---|---|---|
| SR9003 | Monomer | 68-78 |
| SR399LV | Monomer | 1.0-5.0 |
| CN132 | Oligomer | 1.0-5.0 |
| Siltech C-101 | Wetting agent | 0.5-1.0 |
| Irgastab UV10 (BASF) | UV stabilizer | 0.02 |
| Pigment dispersion (15 wt % pigment/EFKA 4340 in SR9003) | Pigment dispersion | 20 |

Formulation A is applied via inkjet 1 (see, FIG. 1) onto an intermediate receiving member 5 (e.g., a drum) having a higher surface energy than the liquid ink surface tension.

After the ink is jetted onto the intermediate substrate 5, the ink is partially cured by a first exposure to low dose (e.g., 0.1-1.0 Mrad) electron beam radiation 4. During the pre-curing step, the monomers/oligomers are partially polymerized to form a tacky film on the intermediate transfer substrate 5. Pre-curing of the transient image increases the cohesion of the ink film and allows for more efficient ink transfer from the intermediate substrate 5 to final substrate 10. The partially cured film 8 is then transferred to the substrate 10 through contact under specified temperature and pressure. The transferred image 9 is then subjected to a higher dose (e.g., 1.0-4.3 Mrad) electron beam irradiation 6 to induce complete crosslinking thereby resulting in an extremely robust image. Image robustness is especially important for packaging applications.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An electron beam curable ink for use in an indirect printing process comprising:
    a radiation curable material selected from the group consisting of a curable monomer, a curable oligomer, and mixtures thereof; and
    a surfactant comprises silicone and is present in the amount of from about 0.1% to about 5% based on the total weight of the ink;
    wherein the ink is partially cured to a viscosity of from about 5,000 to about 1,000,000 cps by exposing the ink to a first electron beam irradiation at a dose of from about 0.1 Mrad to about 1.0 Mrad before transfer from an intermediate transfer member to a final substrate, and further wherein the ink is exposed to a second electron beam irradiation at a dose of from about 1.0 Mrad to about 4.3 Mrad to induce complete crosslinking to form an image.

2. The ink of claim 1, wherein the curable monomer is selected from the group consisting of methacrylate monomer, acrylate monomer, dimethacrylate monomer, diacrylate monomer, triacrylate monomer, and mixtures thereof.

3. The ink of claim 1, wherein the curable oligomer is selected from the group consisting of diacrylate oligomer, aliphatic monoacrylate oligomer, aromatic monoacrylate oligomer, monofunctional acrylic oligomer, tetrafunctional acrylic oligomer, and mixtures thereof.

4. The ink of claim 1, wherein the curable material is present in an amount of from about 50 to about 95 weight percent based on the total weight of the ink.

5. The ink of claim 1, wherein the surfactant is miscible with the radiation curable material.

6. The ink of claim 1, wherein the surfactant comprises one or more functional group selected from the group consisting of carbinol, alkyl, aryl, glycol, polyether, siloxane, and mixtures thereof.

7. The ink of claim 1, wherein the surfactant is present in the amount of from about 0.1% to about 2% based on the total weight of the ink.

8. The ink of claim 1, wherein the ink further comprises a colorant selected from the group consisting of pigment, dye, mixtures of pigment and dye, mixtures of pigments, and mixtures of dyes.

9. The ink of claim 1, wherein the ink has a surface tension of from about 15 to about 50 dynes/cm at a jetting temperature.

10. The ink of claim 1, wherein the ink has a viscosity of from about 2 centipoise to about 20 centipoise at a jetting temperature.

11. The ink of claim 1, wherein the surfactant is present in the amount of from about 0.1% to about 1% based on the total weight of the ink.

12. An electron beam curable ink for use in an indirect printing process comprising:
   a curable monomer;
   a curable oligomer; and
   a silicone surfactant comprises one or more functional group selected from the group consisting of carbinol, alkyl, aryl, glycol, polyether, siloxane, and mixtures thereof, wherein the silicone surfactant is present in the amount of from about 0.1% to about 5% based on the total weight of the ink;
   wherein the ink is partially cured to a viscosity of about 5,000 to about 1,000,000 cps by exposing the ink to a first electron beam irradiation at a dose of from about 0.1 Mrad to about 1.0 Mrad before transfer from the intermediate transfer member to the final substrate, and further wherein the ink is exposed to a second electron beam irradiation at a dose of from about 1.0 Mrad to about 4.3 Mrad to induce complete crosslinking to form an image.

13. The ink of claim 12, wherein the curable monomer is selected from the group consisting of methacrylate monomer, acrylate monomer, dimethacrylate monomer, diacrylate monomer, triacrylate monomer, and mixtures thereof.

14. The ink of claim 12, wherein the curable oligomer is selected from the group consisting of diacrylate oligomer, aliphatic monoacrylate oligomer, aromatic monoacrylate oligomer, monofunctional acrylic oligomer, tetrafunctional acrylic oligomer, and mixtures thereof.

15. A method of printing with an electron beam curable ink comprising:
   a) providing an electron beam curable ink comprising:
      a radiation curable material selected from the group consisting of a curable monomer, a curable oligomer, and mixtures thereof; and
      a surfactant comprises silicone and is present in the amount of from about 0.1% to about 5% based on the total weight of the ink;
   b) applying the ink to an intermediate substrate;
   c) exposing the ink to a first electron beam irradiation to partially polymerize the radiation curable material;
   d) transferring the ink from the intermediate substrate to a final substrate; and
   e) exposing the ink to a second electron beam irradiation to induce complete crosslinking to form an image;
   wherein the ink is partially cured to a viscosity of from about 5,000 to about 1,000,000 cps by exposing the ink to a first electron beam irradiation at a dose of from about 0.1 Mrad to about 1.0 Mrad before transfer from an intermediate transfer member to a final substrate, and further wherein the ink is exposed to a second electron beam irradiation at a dose of from about 1.0 Mrad to about 4.3 Mrad to induce complete crosslinking to form an image.

16. The method of claim 15, wherein the curable monomer is selected from the group consisting of methacrylate monomer, acrylate monomer, dimethacrylate monomer, diacrylate monomer, triacrylate monomer, and mixtures thereof.

17. The method of claim 15, wherein the curable oligomer is selected from the group consisting of diacrylate oligomer, aliphatic monoacrylate oligomer, aromatic monoacrylate oligomer, monofunctional acrylic oligomer, tetrafunctional acrylic oligomer, and mixtures thereof.

* * * * *